Sheet 1 - 2 Sheets.
E. M. Stevens,
Shoe-Sole Machine,
N° 70,481. Patented Nov. 5, 1867.
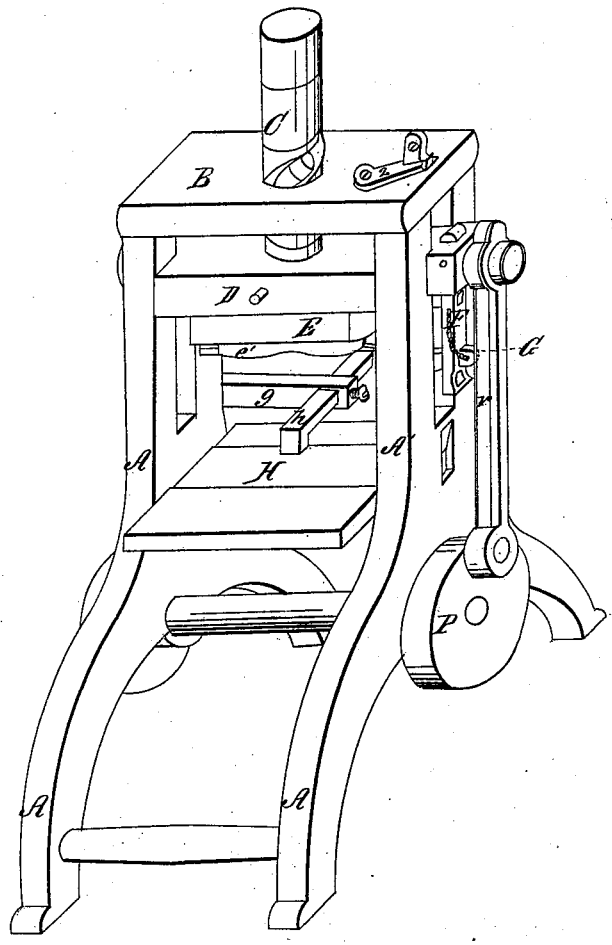
Witnesses:
M. S. G. Wilde
J. H. Adams
Inventor:
E. M. Stevens E. M. Stevens,
Shoe-Sole Machine,
Nº 70,481. Patented Nov. 5, 1867.
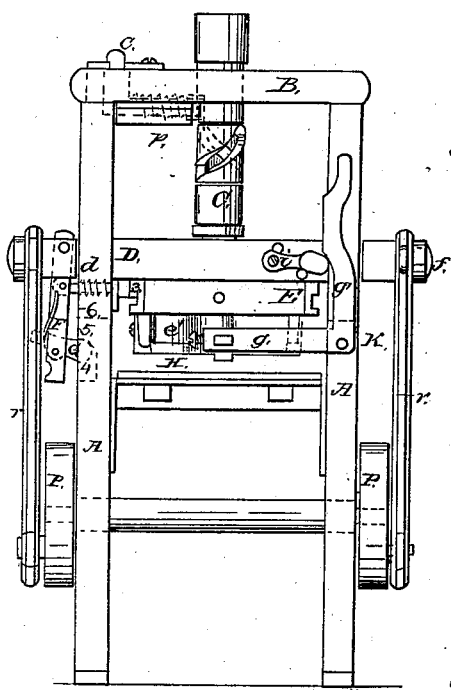
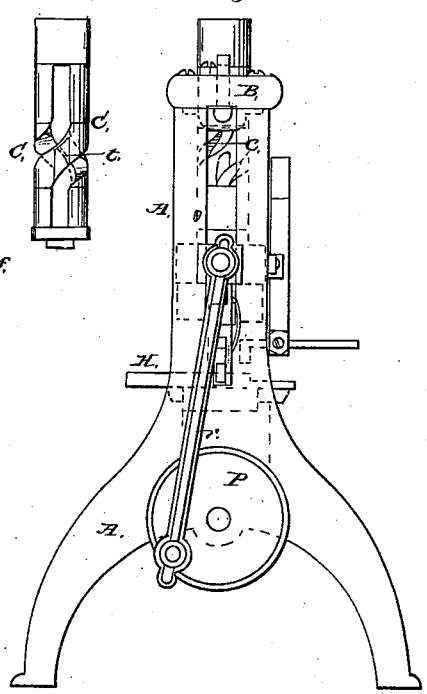
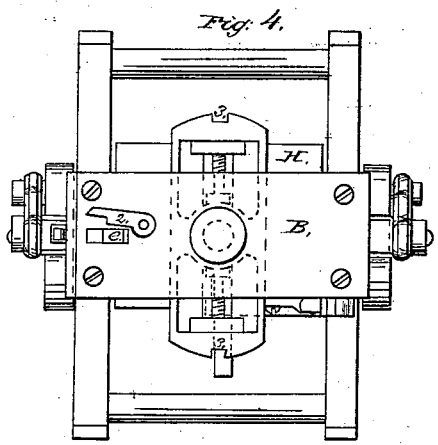
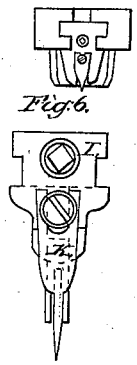
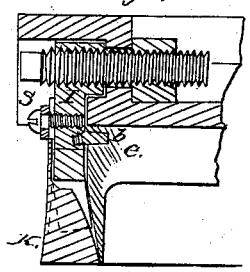
Witnesses.
M. S. G. Wilde.
J. H. Adams.
Inventor:
E. M. Stevens

UNITED STATES PATENT OFFICE.

E. M. STEVENS, BOSTON, MASSACHUSETTS.

IMPROVED MACHINE FOR CUTTING SOLES OF BOOTS AND SHOES.

Specification forming part of Letters Patent No. 70,481, dated November 5, 1867.

*To all whom it may concern:*

Be it known that I, EDGAR M. STEVENS, of Boston, in the county of Suffolk and State of Massachusetts, have invented a new and useful Improvement in Machines for Cutting Soles for Shoes, of which the following is a full, clear, and exact description, reference being had to the accompanying drawings, making a part of this specification, in which—

Figure 1 represents a perspective view of a machine embodying my improvements. Fig. 2 is a rear elevation. Fig. 3 is an end elevation. Fig. 4 is a top and plan view; and Figs. 5, 6, 7, and 8 are details of the same on an enlarged scale.

Similar letters indicate like parts in the several figures.

My invention consists, first in so constructing the spindle to which the knife-head is attached as that in its up-and-down movement the cutter may be made to cut in one position, or by a simple adjustment the cutter will be caused to make one-half a revolution at each upward movement, so as to enable the same to be alternately reversed at each downward stroke or cut.

It also consists in an automatic gage, which will rise out of the way when the sole is cut and allow the said sole and scrap to be pushed off from the table upon which it is cut.

It also consists of an adjustable scrap-cutter, made separate from the die, and easily attached to or detached therefrom, so as to admit of its being adapted to dies of larger or smaller size.

It also consists in a method of locking or unlocking the knife-head for retaining the same in position while being brought down upon the leather from which the sole is cut.

Referring to the drawings, A A' represent the frame of the machine, the upper portion, A', consisting of two uprights formed with vertical slots, in which the cross-head that carries the cutter slides freely.

B is the cap-piece, through which the spindle C plays freely up and down.

D is a cross-head, through which the lower part of the spindle C passes, so as to turn freely.

To the lower end of the spindle C is firmly attached the knife-head E, having secured to its under side the die c'. The spindle C is formed with two spiral slots or grooves, c c, extending each half-way around the same, terminating in a strait or vertical slot or groove above and below the said spiral slots.

Underneath the cap-piece B, at one side of the spindle C, is arranged a sliding rod, P, one end of which fits within the spiral slot or groove c in the spindle, the said rod being pressed forward toward the spindle by means of a spiral or other spring. By this means the spindle is made to turn in its upward movement one-half a revolution.

At the lower end of the spiral groove c, above the end of the sliding rod E, is formed in the spindle a straight groove, t, Fig. 5, inclining outward from the lower to the upper end in such a manner that when the spindle has completed its upward movement and made one-half a revolution the rod P will pass into the said inclined groove and cause the spindle to descend without turning, so as to bring down the cutter upon the leather in a reverse position from the next preceding cut.

The outer end of the sliding rod p is provided with a projection, e, extending upward through a slot in the cap-piece B.

When it is desirable that the spindle should not rotate in its upward or downward motion, the projection-rod p is drawn backward, and retained in that position by means of a catch, 2, as shown in Fig. 1, so as not to engage in the spiral groove of the spindle.

To one end of the cross-head D, outside of the frame A, is pivoted an arm, F, extending downward, as shown in Figs. 1 and 2, and to this arm, just below the cross-head D, is pivoted a dog, d, passing through a guide attached to the under part of the cross-head and through the side of the frame, where it takes into a notch or recess, 3, in the end of the knife-head, as shown in Figs. 2 and 4. The dog d is provided with a spring, that forces it toward the said recess when necessary to retain the knife-head in the proper position for cutting the blank.

Near the lower part of the arm F is pivoted a catch or trigger, G, by which the dog d is operated in the following manner: The knife-head, with the die, being at its lowest position on the bed of the machine, the inner end of the catch G is within a recess, 4, on the outer side of the frame. The upper part of this recess is beveled off, as shown at 5 in Fig. 2, so that as the arm F rises with the cross-head the inner end of the catch G will pass outward, thus forcing out the arm F, and at the same time withdrawing the dog d from the recess 3 in the cutter-head, which thus frees the latter and allows it to turn by the operation of the spindle C in its upward movement.

As the arm F rises the inner end of the catch G will pass over the outer surface of the frame into the slot in the frame in which the cross-head plays, thus freeing the spring-rod d and allowing it to bear upon the sides of the rotating knife-head E until it passes into the recess at the end of said knife-head, thus again retaining the latter in position for another downward stroke of the cutter or die. As the arm F moves downward the inner end of the catch G will be forced into a slot in the said arm, so as to allow the latter to pass downward in contact with the side of the frame without withdrawing the dog d from the recess in the knife-head E.

e' is the cutter or die secured to the under side of the knife-head E.

H represents the bed on which the blank soles or strips are placed to be cut.

At the rear portion of bed H is arranged a gage, h, against which the blank or strip is set when operated upon by the cutter. It is fitted to slide within an opening in the end of the lower arm of an elbow-lever, g g', and is secured in position by means of a set-screw, as will be seen in Fig. 1, so that it can be adjusted to the blank sole or strip, as desired, and adapted to a die of larger or smaller size. The elbow lever g g' is pivoted to the frame A at k, Fig. 2, and is operated as follows: The inner edge of the upright portion of the lever g' is partly curved and partly straight. To the cross-head D is pivoted a small arm, i, which rests in a horizontal position upon a pin, as shown in Fig. 2, the inner end of the said arm bearing against the curved portion of the lever g' when the gage is set. When the sole is cut out and the cutter rises, it is desirable to push off the sole to move the succeeding blank forward, and as the cutter-head rises the arm i forces backward the upright portion of the lever g', which causes the lower portion g of the said lever also to rise, carrying with it the gage h, and thus allowing the blank to be shoved off the rear of the bed. As the cross-head descends the arm i will be raised by the upper curved portion of the lever g', thus allowing the gage to resume its position on the bed in readiness for another blank or strip, the operation being repeated at each upward and downward motion of the cross-head and die.

To each end of the cross-head E is attached a block or holder, I, which carries a scrap-cutter, K. (Shown enlarged in Figs. 6 and 7.) The said cutter is fitted to the die so as to cut the scrap at each end, and thus allow it to be shoved off the bed with the sole. The upper end of the cutter K is formed with a slot, so as to allow of its being adjusted up or down on a screw, S, by which it is secured to the block or holder I, so as to adapt it to dies or cutters of larger or smaller size. The lower portion of the scrap-cutter K is formed as shown in Fig. 7, and is fitted in a slot in the lower part of the holder I, as seen in Fig. 6.

The upper portion of the block or holder I, Fig. 6, is formed with shoulders and a recess to fit within a corresponding mortise in the ends of the knife-head E, and is provided with a pin or projection, l, to prevent any lateral movement.

The block or holder I is attached at each end of the cutter-head by means of a rod passing entirely through the said head longitudinally, and the ends of the said rod are formed, respectively, with a right and left hand screw, as shown in Fig. 4, so that both heads will be attached, detached, or tightened simultaneously.

The cross-head D is attached at each end to a pitman, p, which is connected to a wheel or pulley, P, to which motion may be communicated by any convenient power.

What I claim as my invention, and desire to secure by Letters Patent, is—

1. The spindle C, constructed with the spiral and straight grooves, in combination with the adjustable spring-rod p, when operating in the manner and for the purpose set forth.

2. The gage h, in combination with the lever g g' and tripping device i, substantially as and for the purpose described.

3. The arm F, attached to the cross-head D, and provided with a dog, d, and trigger G, in combination with the knife-head E, as and for the purpose described.

4. The adjustable and detachable scrap-cutter K, as described.

5. The combination of the cutter K, the block or holder I, and the knife-head E, as described.

6. The spindle C, constructed with the spiral and straight slots or grooves, as described.

In testimony whereof I have signed my name to this specification in the presence of two subscribing witnesses.

E. M. STEVENS.

Witnesses:
J. H. ADAMS,
M. S. G. WILDE.